United States Patent [19]
Yevick

[11] 4,172,631
[45] Oct. 30, 1979

[54] PARALLEL OPTICAL FIBER AND STRIP ILLUMINATING ARRAYS

[75] Inventor: George J. Yevick, Leonia, N.J.

[73] Assignee: Izon Corporation, New York, N.Y.

[21] Appl. No.: 811,985

[22] Filed: Jun. 30, 1977

Related U.S. Application Data

[63] Continuation of Ser. No. 539,091, Jan. 7, 1975, abandoned.

[51] Int. Cl.$^2$ ............................................. G02B 5/17
[52] U.S. Cl. ........................... 350/96.25; 350/96.15
[58] Field of Search ............... 350/96.24, 96.25, 96.10, 350/167

[56] References Cited
U.S. PATENT DOCUMENTS

| | | | |
|---|---|---|---|
| 2,946,253 | 7/1960 | Clark, Jr. | 350/96.10 |
| 3,402,000 | 9/1968 | Crawford | 350/96.25 |
| 3,718,515 | 2/1973 | Goldstein | 350/96.24 |
| 3,792,239 | 2/1974 | Ohlhaber et al. | 350/96.24 |

*Primary Examiner*—John K. Corbin
*Assistant Examiner*—Stewart Levy
*Attorney, Agent, or Firm*—Daniel M. Rosen

[57] ABSTRACT

A device for producing an array of point sources of light. A number of parallel optical fibers or strips are positioned on a substrate. One end of the fibers or strips is illuminated by a light source. Light passing through and along each fiber or strip is reflected at spaced longitudinal reflecting faces integral with the fiber or strip. The device exhibits particular utility in illuminating microimages carried by a fiche.

1 Claim, 15 Drawing Figures

FIG. 10
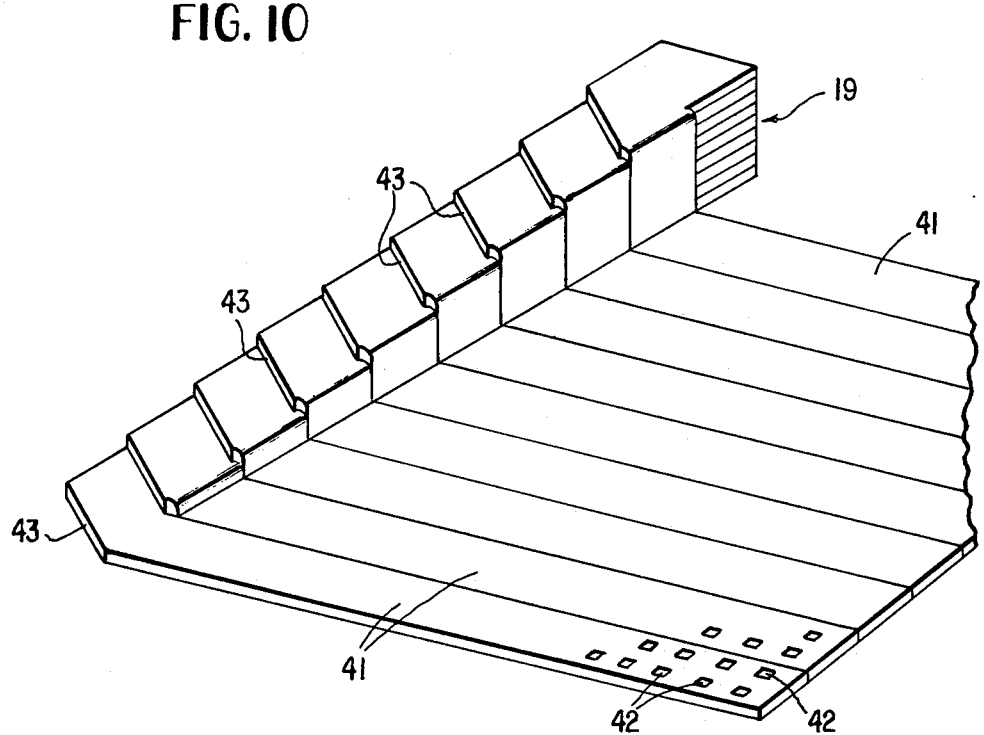
FIG. 11
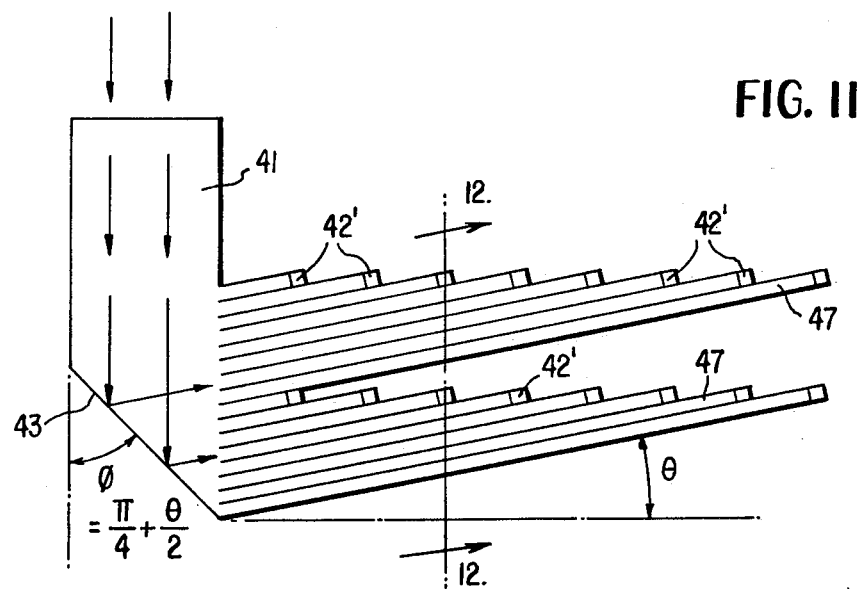
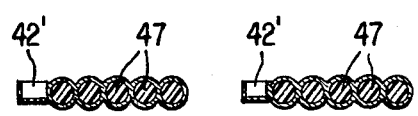
FIG. 12

PARALLEL OPTICAL FIBER AND STRIP ILLUMINATING ARRAYS

This is a continuation of application Ser. No. 539,091 filed Jan. 7, 1975 now abandoned.

This invention relates to a device for producing an array of point sources of light. While the device exhibits utility in any apparatus wherein point sources of light are required, it exhibits particular utility in illuminating microimages. My co-pending application Ser. No. 309,968, filed Nov. 28, 1972, and entitled "Microfiche and Reader" now U.S. Pat. No. 3,864,034, hereby incorporated by reference, discloses a microfiche and projection apparatus. The microfiche is defined by a generally planar and transparent substrate having on one surface a number of integral lenses (termed lensettes because of their small size) and carrying on its other surface a photographic emulsion. Such an article has been termed a lensfiche. In that application, the method of illuminating microimages carried by the emulsion, for projection against a viewing screen, is defined by a plurality of optical fibers of the well-known type which are totally internally reflecting. Light fed to one end of the fibers exits through the other end, with the other end being adjacent the microimages. While satisfactory, it is somewhat difficult to accurately position the terminal ends of the optic fibers in a substrate so that they will be aligned with the microimages of the lensfiche. Furthermore, as many fibers as point light sources were required. If there were N point sources required, N light fibers were required.

In the first two embodiments of the present invention, the number of fibers required is smaller. Thus, for a square array of N point light sources only $\sqrt{N}$ light fibers are required.

According to the practice of the invention, an illuminating device for generating an array of point sources of illumination is formed by placing a plurality of optical fibers in parallel channels on a substrate. The lowermost longitudinal portions of the optical fibers are provided, at spaced longitudinal stations along each fiber, with reflecting faces. Light travelling along the fiber, from a source of illumination, strikes the reflecting faces and is projected upwardly, normal to the plane of the substrate. Such reflecting faces are aligned with microimages or other objects which are to be illuminated.

In another mode of practice of the invention transparent and totally internally reflecting strips are employed to conduct light from a source to the spaced positions beneath a microfiche for illumination for projection of microimages carried thereon.

IN THE DRAWINGS

FIG. 10 is a partially schematic perspective view of the embodiment of FIG. 8.

FIG. 11 illustrates still another embodiment of the invention and is a top view of an embossed strip having two rows of point light sources.

FIG. 12 is a view taken along section 12—12 of FIG. 11.

Figure 1:
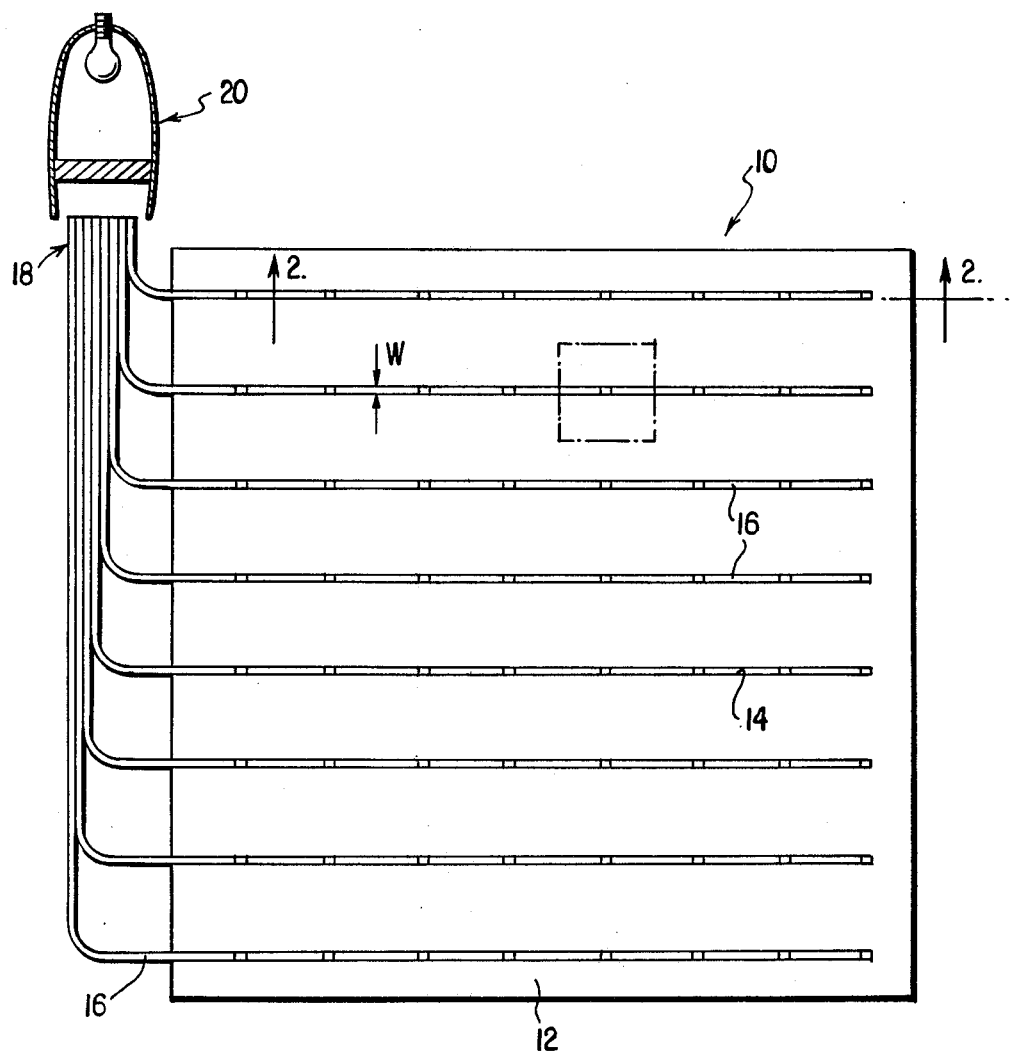
FIG. 1 is a partially schematic plan view of the illumination device of this invention.

Referring now to the drawings, FIG. 1 is a plan view, partially schematic, of an illuminating device according to this invention. The numeral 10 denotes generally the illuminating device and includes a substrate 12. The substrate is preferably of a material having the same thermal coefficient of expansion as a lensfiche of the type shown and described in my noted co-pending application. The substrate is generally planar and rectangular and is provided with a plurality of parallel channels 14, an optical fiber 16 being placed in each channel. The optical fibers are of known type which are totally internally reflecting. They are formed of a transparent material having a first index of refraction and are coated with a second transparent material having a lesser index of refraction. In this manner, light fed into one end is totally reflected as it passes along the length of the fiber. Thus, all or most of the light fed into one end passes out the other end. The numeral 18 denotes generally an entrance bundle which is defined by one of the ends of the fibers 16 joined to form a mass of bundles, and having a generally planar face. The numeral 20 denotes schematically a source of illumination defined by a reflector, a source of light such as an incandescent lamp and a heat-absorbing device. With the lamp energized, light passes therefrom to the input end of bundle 18 and down along the length of each fiber 16. A suitable material of construction for the substrate 12 is aluminum or a plastic such as poly(methylmethacrylate).

Figure 2:
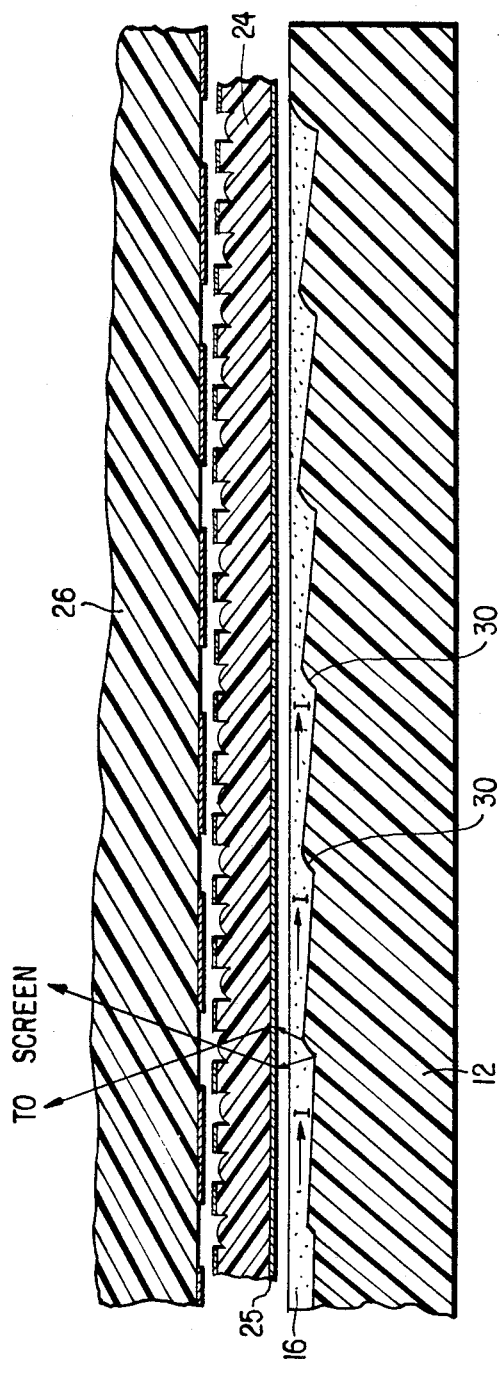
FIG. 2 is a partial cross-section taken along section 2—2 of FIG. 1.
Figure 4:
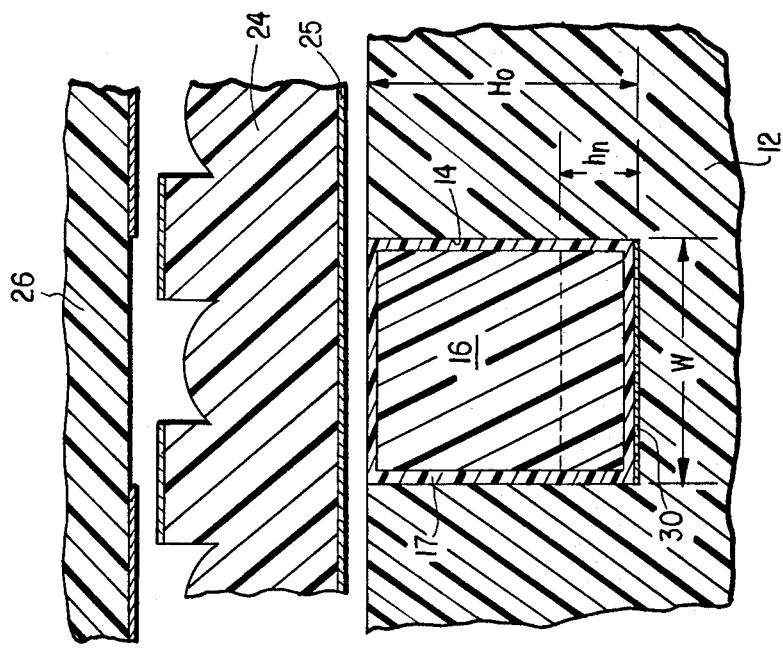
FIG. 4 is a view taken along section 4—4 of FIG. 3.
Figure 3:
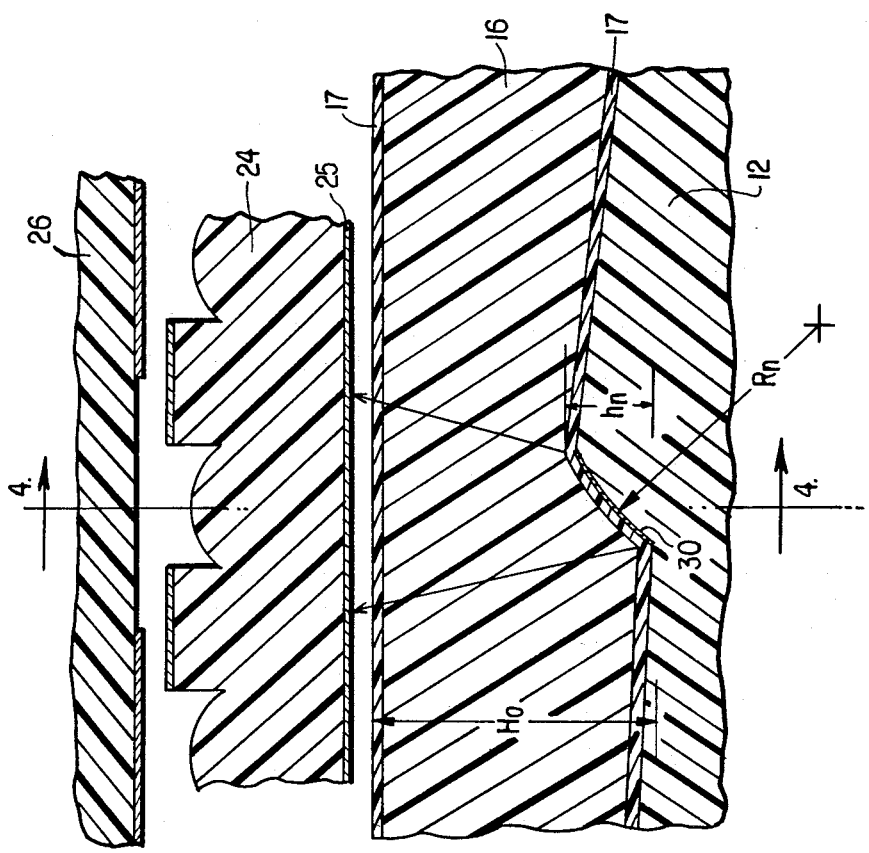
FIG. 3 is a view similar to FIG. 1, but on an enlarged scale and showing only a single reflecting face.

Referring now to FIGS. 2, 3, and 4, a typical optical fiber 16 with its coating 17 is illustrated as positioned on and supported by substrate 12. A lensfiche 24 and portion of a viewing screen 26 are illustrated and are entirely similar to the corresponding elements shown at FIG. 5 of my noted co-pending application. Instead, however, of optical fibers 24 of my noted co-pending application at FIG. 5 illuminating the microimages on emulsion 25 of the lensfiche, certain reflecting faces now to be described are employed. The operation of the device will be apparent. Reflecting faces 30, at longitudinally-spaced stations along each fiber 16, successively reflect some of the illumination fed through bundle end 18 and light source 20 so that reflection takes place upwardly, normal to the plane of substrate 12. As indicated particularly at FIG. 3, reflected light is employed to illuminate a microimage on emulsion 25 of a lensfiche. The reader will comprehend that the action illustrated at FIGS. 2 and 3 takes place at each of the parallel optical fibers 16, to thereby generate an array of point sources of light. Each point source of light is defined by light reflected upwardly from a face 30.

The manner of calculating the height $h_n$ of each of convex reflecting face 30 is given from the following considerations. Assume the average flux density of the light in the forward direction to be $I_o$. When it strikes the first reflecting face 30 an amount to be extracted is proportional to $I_o H_o W$ all divided by $N_c$ where W is the width of the reflecting face. Therefore, the height $h_1$ of the first face 30 is given by $$I_o h_1 W = (I_o H_o W)/N_c,$$

where $N_c$ is the number of faces along a fiber. Hence, $$h_1 = H_o/N_c$$

Now, the total amount of flux available is no long $I_o H_o W$, but rather $I_1$, where $I_1$ is given by $$I_1 H_o W = I_o H_o W - \frac{I_o H_o W}{N_c}$$
$$= I_o H_o W (1 - \frac{1}{N_c})$$

or $$I_1 = I_o (1 - \frac{1}{N_c})$$

Again, it is required that the second face have a height $h_2$ such that $$I_1 h_2 W = (I_o H_o W)/N_c$$

or $$h_2 = \frac{h_1}{1 - \frac{1}{N_c}} = \frac{H_o}{N_c(1 - \frac{1}{N_c})} = \frac{H_o}{N_c - 1}$$

The light incident on the third mirror will have an average intensity $I_2$ given by $$I_2 H_o W = I_o H_o W - \frac{I_o N_o W}{N_c} - I_1 h_2 W$$
$$= I_o H_o W - \frac{2 I_o N_o W}{N_c}$$
$$= I_o H_o W (1 - \frac{2}{N_c})$$

or $$I_2 = I_o (1 - \frac{2}{N_c})$$

Again, the light "extracted" by the third mirror is the same as the first two; hence, $$I_2 h_3 W = (I_o H_o W)/N_c$$

or $$h_3 = \frac{H_o}{N_c(1 - \frac{2}{N_c})} = \frac{H_o}{N_c - 2}$$

Hence, the general expression for any height $h_n$ is given by $$h_n = \frac{H_o}{N_c - (n-1)}$$

or,

-continued $$h_n = \frac{\text{diameter of fiber}}{\text{number of reflecting surfaces} - (n-1)}$$

The final height $H_{N_c} = H_o$, as is expected.

When n is small, $h_n$ is likewise small and in general less than delta, the linear extent of a micro-object to be illuminated. In order, therefore, to fill the micro-object with light, the mirror must be made convex. As the height of the mirrors or faces increases, the nature of the mirror changes. To see this requires a detailed analysis given below.

Figure 7:
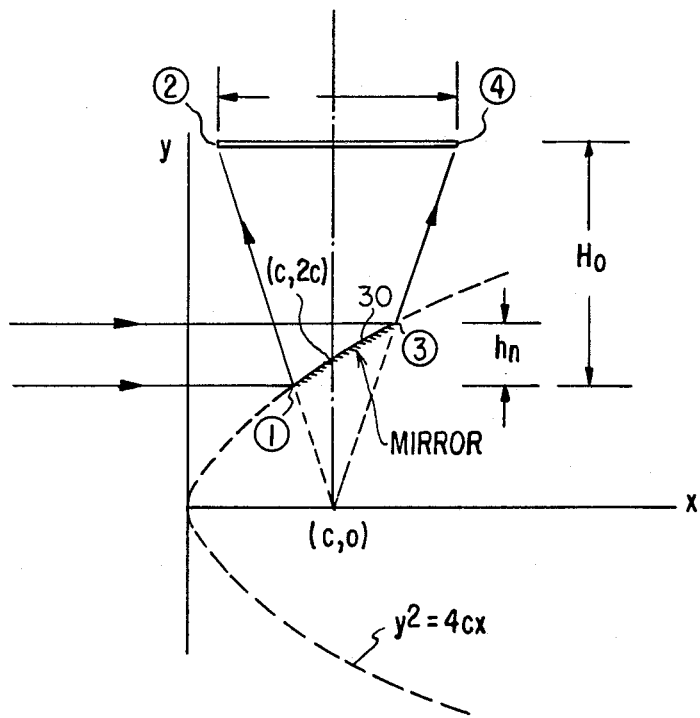
FIG. 7 is a view indicating a mode of calculation of the specific shape of certain reflecting faces.

FIG. 7 is a partially schematic diagram of the geometry of a typical mirror or face 30. The mirror is a portion of a cylindrical parabolic reflector. The problem that must be solved is to find the equation for a parabolic mirror as a function of n required to illuminate an object of extent delta ($\Delta$).

Assume parallel light incident on the illustrated cylindrical parabolic section and the reflected light covers the object to be illuminated, of width $\Delta$.

The equation for the parabolic surface is given by $$Y^2 = 4cx$$

where the coordinate system chosen is shown in FIG. 7. The quantity c is the focal distance to the vertex of the parabola.

Consider the $n^{th}$ mirror. The intersection of the lower light parallel to x axis strikes the reflector at point 1, whose (x,y) coordinates are $(x_1, 2\sqrt{cx_1})$ where $x_1$ and c are to be determined. This light reflects from the mirror and just grazes the left end of the object located at point 2, whose coordinates are $(x_2, 2\sqrt{cx_1} + H_o)$ whereby $$x_2 = c - (\Delta/2)$$

The equation of a straight line passing through points (1) and (2) is given by $$y = -\frac{(H_o + 2\sqrt{cx_1})}{(\Delta/2)} (x - c)$$

But it is also clear that the ray midway between the top and bottom rays of FIG. 7 strikes the mirror at point (c,2c); hence the y-coordinate of point 1 is given by $$y_1 = 2c - (h_n/2) = 2\sqrt{cx_1}$$

or $$x_1 = \frac{1}{4c} (2c - \frac{h_n}{2})^2$$

At the point of intersection of the parabola and straight line, at point 1, $$2c - \frac{h_n}{2} = -\frac{(H_o + 2cx_1)}{(\Delta/2)} (x_1 - c)$$

One can now eliminate $x_1$ to obtain a quadratic equation for c in terms of the known quantities $h_n$, $\Delta$, and $H_o$.

$$2c - \frac{h_n}{2} = \frac{h_n}{\Delta} (H_o + 2c - \frac{h_n}{2})(1 - \frac{h_n}{8c})$$

or

-continued
$$2(1 - \frac{h_n}{\Delta})(\frac{c}{h_n})^2 - (\frac{1}{2} + \frac{H_o}{\Delta} - \frac{3h_n}{\Delta})(\frac{c}{h_n}) + \frac{1}{8\Delta}(H_o - \frac{h_n}{2}) = 0$$

This quadratic equation can be solved for c, given the values of $\Delta$, $h_n$ and $H_o$.

Once c is determined the complete shape of the mirror is uniquely defined.

The (x,y) coordinates for points 1, 2, 3, and 4 are now as follows:

point 1 — $(\frac{1}{4c}(2c - \frac{h_n}{2})^2, 2c - \frac{h_n}{2})$ point 2 — $(c - \frac{\Delta}{2}, 2c - \frac{h_n}{2} + H_o)$ point 3 — $(\frac{1}{4c}(2c + \frac{h_n}{2})^2, 2c + \frac{h_n}{2})$ point 4 — $(c + \frac{\Delta}{2}, 2c + H_o - \frac{h_n}{2})$ where c is given by the above quadratic equation for c. In the quadratic expression for c, if $h_n < \Delta$ the mirrors are concave upward. When $h_n = \Delta$, the mirror is flat, and when $h_n > \Delta$, the mirrors become convex.

Figure 5:
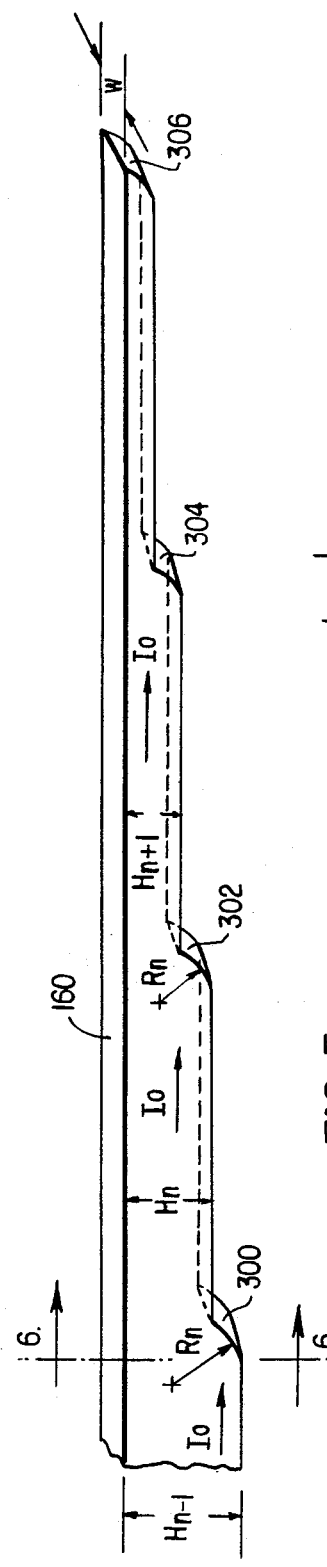
FIG. 5 is a partially perspective view of an optical fiber, according to a second embodiment of the invention.
Figure 6:
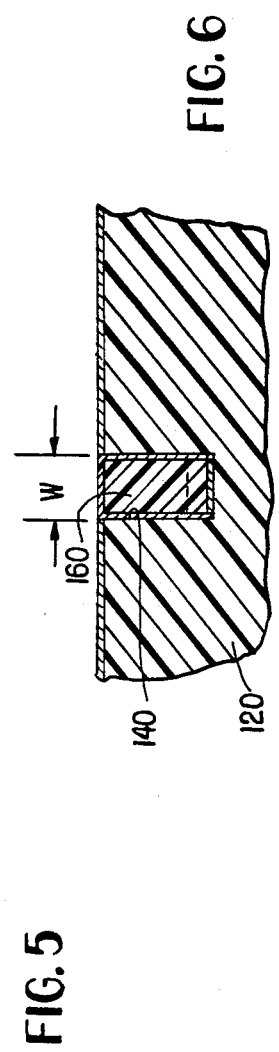
FIG. 6 is a view taken along section 6—6 of FIG. 5.

Referring now to FIGS. 5 and 6 of the drawings, another embodiment is illustrated. Here, instead of each optical fiber 16 being of uniform average cross-section, it is tapered. The numeral 160 denotes a typical optical fiber according to this embodiment, it being understood that these fibers are positioned in a substrate in the same manner as that shown at FIG. 1. A plurality of integral reflecting faces 300, 302, 304, and final face 306 are provided, with each face being concave, flat or convex depending upon the vertical height chosen. The vertical height of each reflecting face 300, 302, etc., at each of the spaced longitudinal portions along the fiber, is the same. It will be understood that the operation of this embodiment is the same as that earlier given. Incident light coming from the left to the right, from the (not illustrated) input end of the fibers 160 is successively reflected at the reflecting faces.

Again the shape of the mirrors is determined using the same type of analysis presented above. If the mirrors are smaller than $\Delta$, then a concave mirror is required. If $h_n$ equals $\Delta$, a plane mirror is required. And finally, if $h_n$ is greater than $\Delta$, convex mirrors will be required to illuminate an object having extent $\Delta$.

Figure 8:
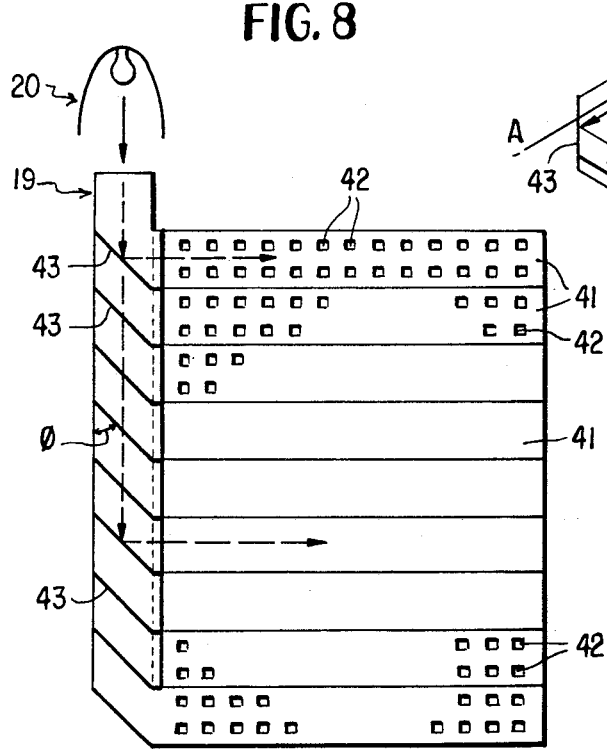
FIG. 8 is a partially schematic plan view of a third embodiment of the invention wherein light is directed by light conducting strips.
Figure 9:
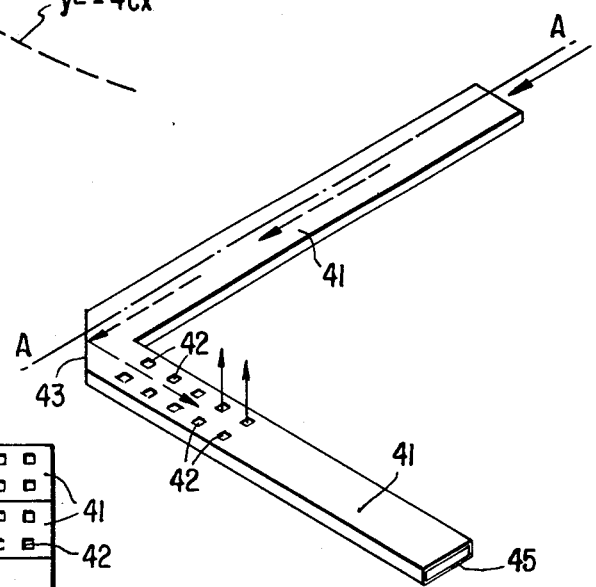
FIG. 9 is a partial perspective view of an L-shaped strip employed in the embodiment of FIG. 8.

Referring now to FIGS. 8–10, a third embodiment 40 of the invention is illustrated and is comprised of a set of stacked L-shaped transparent, internally reflecting strips 41 each having at least one row (or column) of reflectors 42 therewithin to thereby define a regular array of light sources. The nature and mode of fabrication of such internal reflectors is more fully disclosed with particular reference to FIGS. 7–9 in copending application Ser. No. 536,409 filed Dec. 26, 1974 by L. W. Grunberger entitled "Point Array Sheet Lighting Apparatus" herein incorporated by reference, commonly assigned, now abandoned in favor of continuation application Ser. No. 889,736 filed Mar. 24, 1978. Collimated light from lamp 20 falls on the shorter left of each strip, the legs defining an entrance bundle 19. The transparent, flat strips 41 each have an outer coating 45 of index of refraction $n_1$ the strips being of index of refraction $n_2$, greater than $n_1$. The light entering any strip end is conducted and reflected along the strip to a mirror surface 43 over the thickness of the strip and which is located at an angle $\theta$ with respect to the vertical (FIG. 8). This light now becomes incident on the reflecting surfaces of at least one row (or column) of mirrors 42, as more fully described in said Grunberger application. Each leg 41 at FIG. 10 for example lies in a first reference plane, and the legs there are all coplanar.

FIG. 9 is partially schematic view of a single L-shaped light conducting strip. Mirror 43 may be vacuum deposited aluminum, and is applied exteriorly at the truncated bend of each L strip.

FIG. 10 is partially schematic perspective view of the apparatus of FIG. 8. The mode of bending each L strip to define a plane containing the regular array of point light sources is more readily apparent. In lieu of the shown bending, the mid-vertical strip may be planar, with the strips below and above it bent oppositely.

FIG. 11 is a top view of an embodiment wherein an L-strip such as that of FIG. 9 is embossed into light conducting channels 47. Such embossing is also described in my noted copending application. The angle $\phi$ in FIG. 11 is given by $(\pi/4)+(\theta/2)$. The terminal end of each channel 47 is slanted to define a reflecting face 42' to reflect light ninety degrees from the channel, and hence orthogonal to the plane of the strips 41. The strips are bent as in the manner of FIG. 10.

The several embodiments above have been described with respect to apparatus for producing point sources of parallel rays of light. In some applications a cone of light may be required. For such instances it is only necessary to so orient the reflecting surfaces 30 and 42 that they each reflect light incident thereon out to a common point.

Although two full rows of lights are illustrated in FIG. 11 it is possible that one L-shaped lighting strip need accomodate only a portion of a row or column with the remainder of the row provided for by one or more additional strips lying below the first and coming up to the lighting plane to complete the row.

FIG. 12 is a cross section 12—12 of FIG. 11 and shows the position of the mirrors 42' and the five fibers 47 in each branch.

Figure 13:
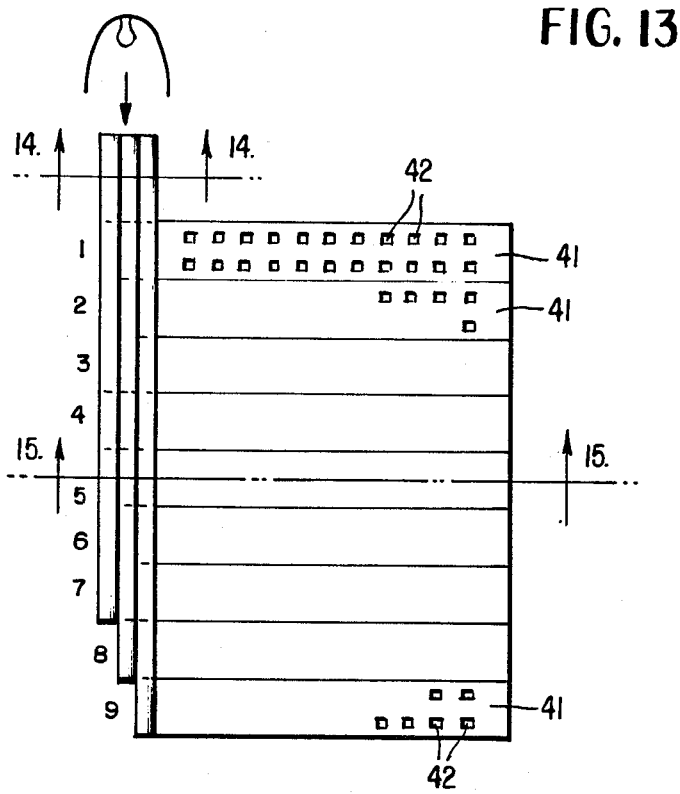
FIG. 13 is a partially schematic plan view of another embodiment wherein a portion of the strip element of FIG. 9 is rolled, instead of being flat.
Figure 14:
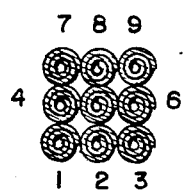
FIG. 14 is a view taken along section 14—14 of FIG. 13.
Figure 15:
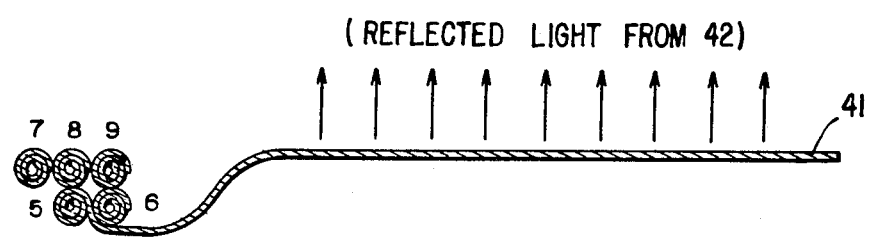
FIG. 15 is a view taken along section 15—15 of FIG. 13.

FIG. 13 illustrates another embodiment of the invention, but similar to FIGS. 8–10. The L strips are each rolled, as by rolling about axis A—A of FIG. 9. There are numerous ways of rolling and stacking, and FIGS. 14 and 15 show one example.

Referring again to FIG. 13, L strips 41 of FIG. 9 are utilized, although the embossed strips of FIG. 11 can also be used. Each rolled portion is denoted by a lower case letter to illustrate the configuration. As in FIG. 10, the right portions are coplanar.

I claim:

1. An illuminating device for producing an array of point sources of light, including,
   (a) plurality of generally L-shaped transparent strips having the property of total internal reflection,
   (b) one leg of each strip carrying means for reflecting light orthogonally out of the plane of said one leg at a plurality of spaced points therealong,
   (c) the legs of each strip which carry the reflecting means being coplanar,
   (d) each of the other legs of each strip being bunched together and adapted to receive illumination,
   (e) each junction of the legs of each said L strip being truncated and being mirrored to reflect light internally from along one leg to along the other,
   (f) each of said other legs being rolled in a spiral form about its longitudinal axis.

* * * * *